United States Patent
Mori

[11] Patent Number: 5,434,857
[45] Date of Patent: Jul. 18, 1995

[54] CIRCUIT FOR CONFIRMING A CONNECTION ROUTE OF ADDRESS CONTROL MEMORY

[75] Inventor: Hiroaki Mori, Osaka, Japan
[73] Assignee: Fujitsu Limited, Kawasaki, Japan
[21] Appl. No.: 205,329
[22] Filed: Mar. 3, 1994
[30] Foreign Application Priority Data
 Aug. 25, 1993 [JP] Japan ................. 5-210604
[51] Int. Cl.6 ............................. H04Q 11/04
[52] U.S. Cl. ............................. 370/66; 370/68
[58] Field of Search .............. 370/53, 54, 55, 56, 370/58.1, 58.2, 58.3, 59, 63, 64, 65.5, 66, 67, 68, 68.1

[56] References Cited

U.S. PATENT DOCUMENTS

| | | | |
|---|---|---|---|
| 3,956,593 | 5/1976 | Collins et al. | 370/63 |
| 4,470,139 | 9/1984 | Munter | 370/66 |
| 4,759,012 | 7/1988 | Suzuki | 370/66 |
| 4,941,141 | 7/1990 | Hayano | 370/58.1 |
| 5,040,174 | 8/1991 | Takeuchi et al. | 370/66 |
| 5,123,012 | 6/1992 | Suzuki et al. | 370/66 |

FOREIGN PATENT DOCUMENTS

| | | |
|---|---|---|
| 47706 | 4/1978 | Japan . |
| 264798 | 11/1987 | Japan . |
| 265888 | 11/1987 | Japan . |
| 160563 | 6/1992 | Japan . |
| 321151 | 11/1992 | Japan . |

Primary Examiner—Alpus Hsu

[57] ABSTRACT

A circuit for confirming a connection route of an address control memory includes a data memory, an address counter and the address control memory. The address control memory includes a reading memory for storing data to an address which is a respective position of the time-division multiplexed data in time slots given when the time-division multiplexed data is read from the data memory as an output data and the data is a respective position of the time-division data in the time slots given when the time-division multiplexed data is written into the data memory as input data. A writing memory is provided for storing data to an address which is a respective position of the time-division multiplexed data in time slots given when the time-division multiplexed data is written to the data memory as input data, and the data is a respective position of the time-division multiplexed data in time slots given when the time-division multiplexed data is read from the data memory, thereby specifying from the time slot position of data at the time of reading, the time slot position of data at the time of writing, and specifying from the time slot position of data at the time of writing, the time slot position of data at the time of reading.

6 Claims, 8 Drawing Sheets

CIRCUIT FOR CONFIRMING A CONNECTION ROUTE OF ADDRESS CONTROL MEMORY

BACKGROUND OF THE INVENTION

1. Field of the Invention

The invention relates to a circuit for confirming a connection route of ACM (Address Control Memory). More particularly, it relates to a circuit for confirming a connection route of ACM used for a time switch which voluntarily changes in a time slot position of time-division multiplexed data.

2. Description of the Related Art

Figure 6:
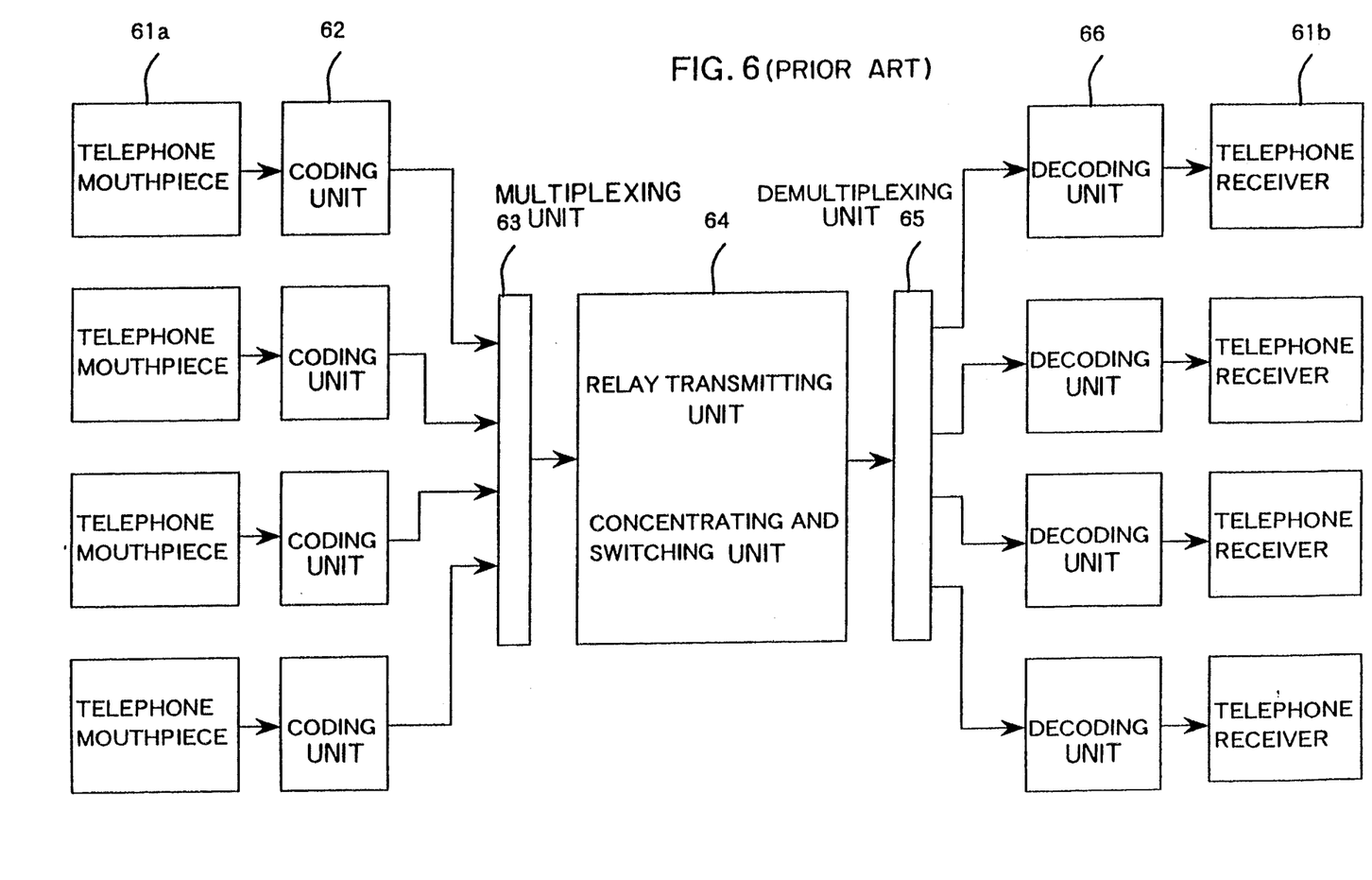
FIG. 6 is a block diagram showing an example of a conventional digital telephone circuit.

FIG. 6 is a block diagram showing an example of a conventional digital telephone circuit. As shown in this figure, conventional digital telephone circuits encode a voice signal transmitted from a plurality of mouthpiece 61a, in a coding unit 62 into a digitalized and compressed form followed by converting the encoded signal from parallel to serial into a multiplexed form in a multiplexing unit 63 so that such signal is concentrated and exchanged at a relay transmitting unit 64 which includes a concentrating and switching unit 64a which includes concentrating and switching unit 64a.

The exchanged voice signal is converted from serial to parallel at a demultiplexing circuit or unit 65 into a demultiplexed form. Then, the voice signal is decoded into an analog form in a decoding circuit or unit 66. The analog voice signal is transmitted to each telephone receiver 61b.

Figure 7:
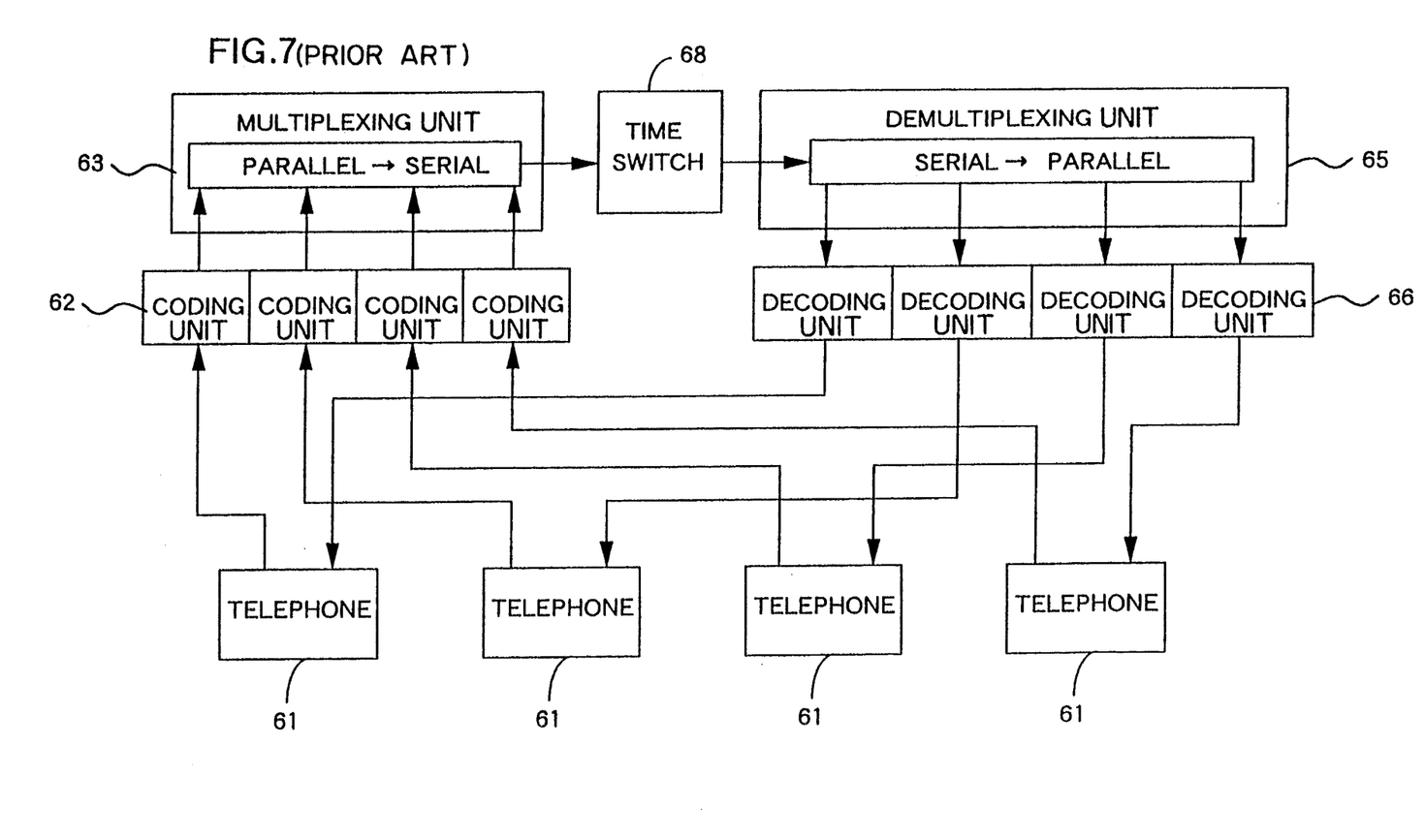
FIG. 7 is a block diagram showing an arrangement of a time switch in the relay transmitting unit.

FIG. 7 is a block diagram showing an arrangement of a position of the time switch provided in the relay transiting unit 64. As this figure shows, the voice signal sent from each telephone 61 passes through the respective coding unit 62 and is converted from parallel to serial at the multiplexing unit 63. Then, the voice signal is concentrated and exchanged at the relay transmitting unit 64 (shown in FIG. 6). When the relay transmitting unit 64 exchanges the voice signal, the position of the data or signal in a time slot is changed by a time switch 68.

The signal having thus changed its position in a time slot is converted from serial to parallel at the demultiplexing unit 65, and is transmitted to each telephone 61 through the respective decoding unit 66.

Figure 8:
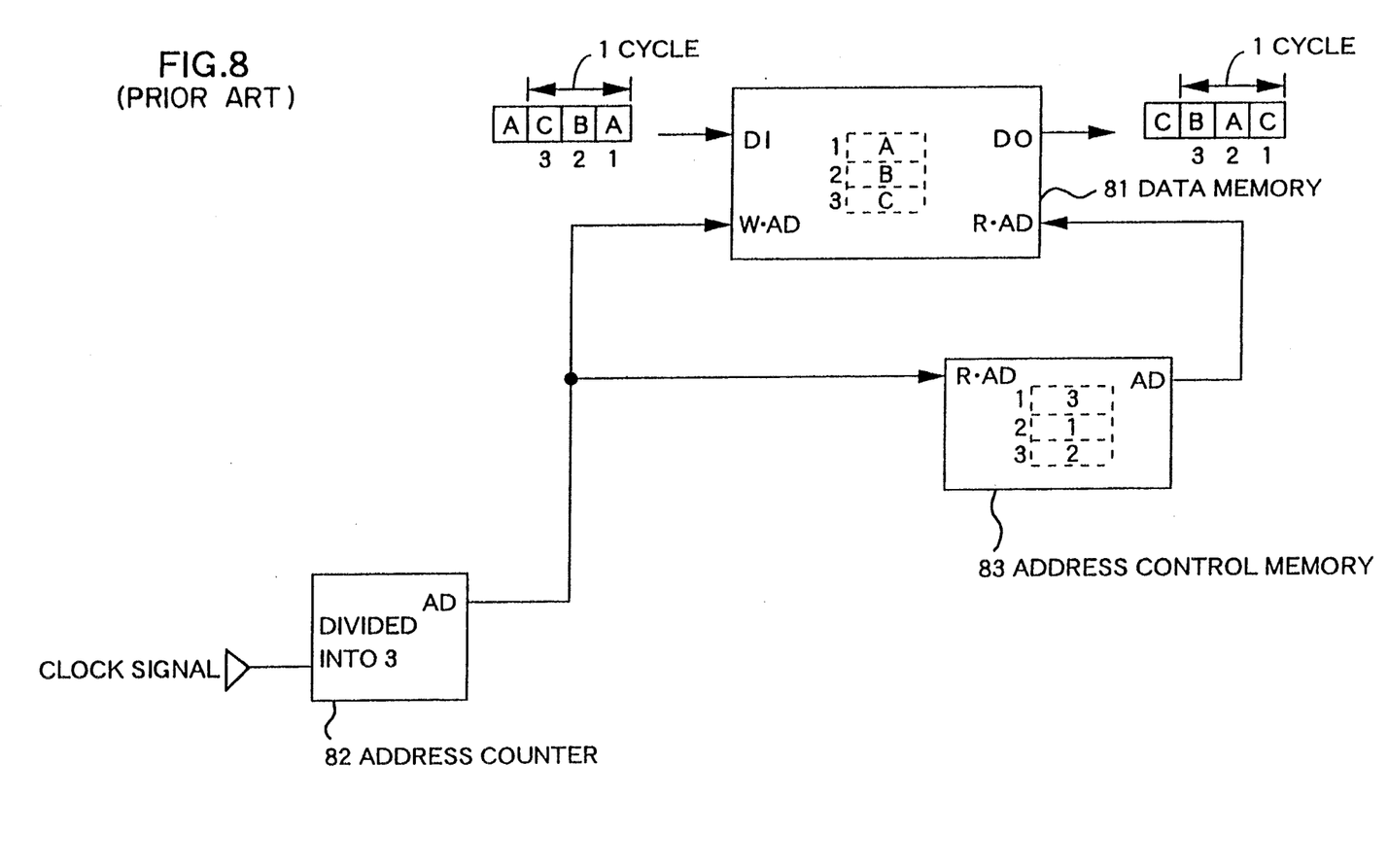
FIG. 8 is a block diagram showing a conventional time switch structure.

FIG. 8 is a block diagram showing a structure of the conventional time switch 68. As shown in this figure, the time switch 68 which voluntarily changes the position of the time-division multiplexed data with the passage of time comprises a data memory 81 for storing data entered in each position in a time slot, an address counter 82 for counting a clock signal cyclically and an address control memory 83 for memorizing the position of the data in a time slot to be changed with respect to the entered data.

The time switch 68 is available in two types. One has a structure of sequential write/random read shown in FIG. 8 in which the address control memory 83 is arranged on the side of the data memory 81 at which the reading address is designated, and the other has an opposite structure of random write/sequential read shown in FIG. 9 in which the address control memory 83 is arranged on the side of the data memory 81 at which the writing address is designated.

The time switch 68 having sequential write/random read structure as shown in FIG. 8 performs the following processing when data is entered in which one-cycle time slot positions are set in the order of A, B and C, and a sequence of data thus entered is output with the time slot position thereof being converted into the order of C, A and B.

At the time of data writing to the data memory 81, the addresses are designated sequentially based on the address values counted by the address counter 82, and the entered serial data are written into the data memory 81 in the order of A, B and C (sequential write).

At the time of data reading, the address values counted by the address counter 82 are changed by the address control memory 83 and the data are read from the data memory 81 in the order of C, A and B in accordance with the changed address values (random read).

Namely, according to the time switch 68 having the sequential write/random read structure shown in FIG. 8, the address values 1, 2 and 3 counted by the address counter 82 are changed to the values of 3, 1 and 2 by the address control memory 83.

Figure 9:
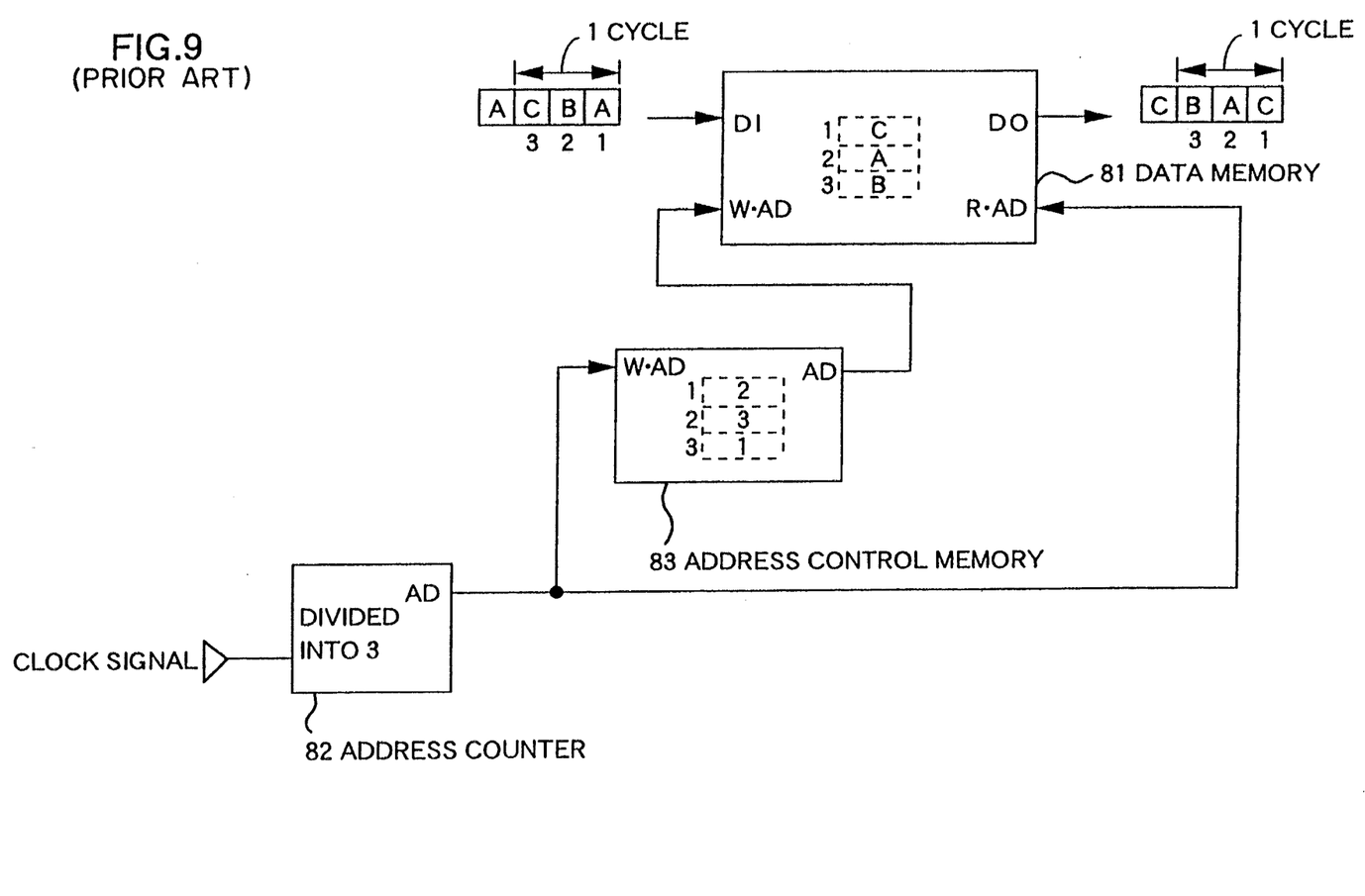
FIG. 9 is a block diagram showing another conventional time switch structure.

On the other hand, the time switch 68 having random write/sequential read structure performs the following processing to do the same work as mentioned above.

As shown in FIG. 9, at the time of data writing to the data memory 81, the address values counted by the address counter 82 are changed by the address control memory 83, and the entered serial data are written to the data memory 81 in the order of C, A and B in accordance with the changed addresses (random write).

At the time of data reading, the addresses are designated sequentially based on the address values counted by the address counter 82, and the data are read from the data memory 81 in the order of C, A and B (sequential read).

Namely, according to the time switch 68 having the random write/sequential read structure shown in FIG. 9, the address values 1, 2 and 3 counted by the address counter 82 are changed to the values of 2, 3 and 1 by the address control memory 83.

However, in case of circuit failures conventional time switches 68 require the confirmation of a position of data in the time slot at the time of data writing from the position of data in the time slot at the time of data reading or a position of data in a time slot at the time of data reading from the position in the time slot at the time of data writing, such time switches have a disadvantage that all the data stored in the address control memory 83 have to be read at maximum for the confirmation of changed data of the data position in the time slot written into the address control memory 83 (where the data entered in a certain position at the time of writing is output from that at the time of reading) in bits.

For example, according to the time switch 68 having the sequential write/random read structure shown in FIG. 8, the data in the second position of the time slot in the address control memory 83 is read in order to confirm where the position of the data in the second position of the time slot on the output side is located on the input side. It is instantly found that the data in the second position of the time slot on the input side is the data in the first position of the time slot on the output side.

However, in order to confirm where the position of the data in the second position of the time slot on the input side is located on the output side, it is necessary to sequentially read all the data in the address control memory 83. Accordingly, it is impossible to judge that the data in the second position of the time slot on the input side is located in the third position of the time slot on the output side, until confirming that the data having the value of "2" corresponds to the address of "3" in the address control memory 83.

As the result, in the time switch 68 having the sequential write/random read structure, the position of the time slot on the input side can be instantly examined from the output side, but it requires a long time to examine the position of the time slot on the output side from the position of the time slot on the input side.

On the other hand, in the time switch 68 having the random write/sequential read structure, the position in the time slot on the output side can be instantly examined from the input side, but it requires a long time to examine the data position in the time slot on the input side from the data position in the time slot on the output side.

As the conventional time switches are known a time switch for a time-division exchange disclosed in Japanese Unexamined Patent Publication 62(1987)-264798 and a time-division space switch disclosed in Japanese Unexamined Patent Publication 62(1987)-265888.

Further, as an address control is known a scanning method disclosed in Japanese Unexamined Patent Publication 53(1978)-47706, and an address designating device is disclosed in Japanese Unexamined Patent Publication 4(1992)-60563, and a device having a circuit for maintaining an address control memory is disclosed in Japanese Unexamined Patent Publication 4(1992)-321151.

SUMMARY OF THE INVENTION

The object of the present invention is to provide a circuit for confirming a connection route of ACM capable of instantly confirming the changed data position in a time slot from both the input and output sides by comprising both of a first address control memory for a sequential write/random read and a second address control memory for random write/sequential read.

The present invention provides a circuit for confirming a connection route of an address control memory comprising: a data memory for storing time-division multiplexed data applied to a plurality of time slots for each of the time slots; address designating means for designating a writing address and a reading address to the data memory; and address changing means for changing either of the writing address or the reading address designated by the address designating means to a different address, wherein the address changing means is included in the address control memory comprising: a reading memory for storing data to an address which is a position of the data in the time slots given when the time-division multiplexed data is read from the data memory, the data being a position of the multiplexed data in the time slots given when the time-division multiplexed data is written to the data memory, and a writing memory for storing data to an address which is a position of the multiplexed data in time slots given when the time-division multiplexed data is written to the data memory, the data being a position of the multiplexing data in the time slots given when the time-division multiplexed data is read from the data memory, thereby specifying from the positions of the time-division multiplexed data in the time slots given when the data are read from the data memory, the positions of the time-division multiplexed data in the time slots given when the data are written to the data memory, and specifying from the positions of the time-division multiplexed data in the time slots given when the data are written to the data memory, the positions of the time-division multiplexed data in the time slots given when the data are read from the data memory.

According to the present invention, where data output from a certain time slot position is entered in on the input side, and where data entered in a certain time slot is output from on the output side can be instantly confirmed.

DESCRIPTION OF THE PREFERRED EMBODIMENT(S)

A data memory used for the present invention includes various memories capable of writing data which are time-divisionally multiplexed to corresponding time slots for each and capable of reading them. In general, RAM (Random Access Memory) may be used as the data memory in which data are written and read by designating address.

An address designating means used for the present invention includes various devices capable of designating the writing address and reading address. In general, an address counter may be used as the address designating means in which a clock signal is counted and writing address and reading address are designated by the counted values to the data memory.

An address changing means used for the present invention includes various devices capable of changing either of the writing address or the reading address designated by the address designated means to a different address. Among them, an address control memory may be typically used. Generally, RAM is used as the address control memory.

According to the present invention, the address control memory comprises two memories, i.e., a reading memory and a writing memory.

The reading memory stores data to an address which is a respective position of the time division time slots, given when the time-division multiplexed data is read from the data memory, as an output data and the data stored is a position of the time-division multiplexed data in time slots, given when the time-division multiplexed data is written to the data memory as input data. Accordingly, the time slot position at the time of writing can be specified from that of reading by reading data from the reading memory as output data.

The writing memory stores data to an address which is a respective position of the time-division multiplexed data in time slots, given when the time-division multiplexed data is written to the data memory, as input data and the stored data is a position of the time-division multiplexed data in time slots, given when the time-division multiplexed data is read from the data memory as output data. Accordingly, the time slot position of data at the time of reading can be specified from that of writing by reading data from the writing memory as input data.

When the reading address designated by the address counter is changed to a different address, the reading memory is connected to the data memory on the side of designating the reading address (output side). In this arrangement, the data writing to the data memory is conducted sequentially in accordance with the counted value which is counted by the address counter, while the data reading from the data memory is conducted at random by changing the counted value which is counted by the address counter in accordance with the reading memory.

When the writing address designated by the address counter is changed to a different address, the writing memory is connected to the data memory on the side of designating the writing address (input side). In this arrangement, the data writing to the data memory is conducted at random by changing the counted value which is counted by the address counter in accordance with the writing memory, while the data reading from the data memory is conducted sequentially in accordance with the counted value which is counted by the address counter.

Data is written in the reading memory and writing memory such that the address and data are replaced with each other. For example, when the data are written in the reading memory as follows:
 "Data 3" in "Address 1"
 "Data 1" in "Address 2"
 "Data 2" in "Address 3"
the data are written in the writing memory as follows:
 "Data 2" in "Address 1"
 "Data 3" in "Address 2"
 "Data 1" in "Address 3".

In that case, the data reading and data writing is preferably conducted by designating address and data from a microcomputer.

The address counter preferably has a structure that a clock signal used for writing data to and reading data from the data memory is divided cyclically in accordance with the number of the time slots of the time-division multiplexed data to be written to the data memory and the time slots are counted, whereby the address is designated by the counted value to the data memory.

The present invention is described in detail by reference to the examples shown in the figures. However, it is not intended to limit the scope of the present invention.

Figure 1:
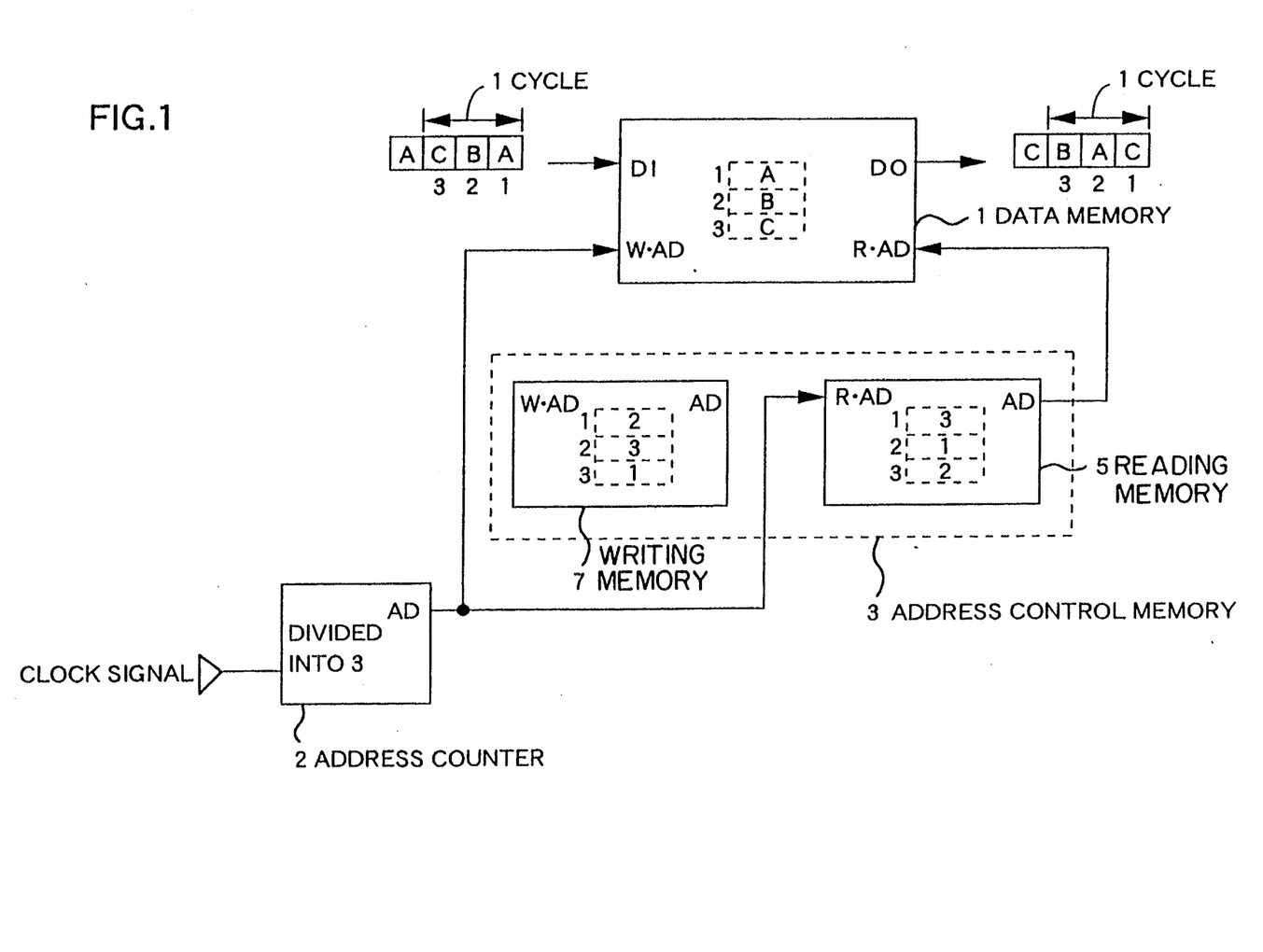
FIG. 1 is a block diagram showing an example of the present invention.

FIG. 1 shows a block diagram illustrating one example of a circuit for confirming a connection route of ACM (Address Control Memory) in a time switch according to the present invention. The time switch is used for a relay transmitting unit of a digital telephone circuit. Since the arrangement of the time switch in the relay transmitting unit is the same as the conventional one shown in FIGS. 6 and 7, the description of the arrangement is omitted and only the confirming circuit in the time switch itself is described hereinafter.

In FIG. 1, reference numeral 1 denotes a data memory to which time-division multiplexed data applied to a plurality of time slots are written. At the time of data writing to the data memory 1, the data memory 1 stores data that are entered from a data input port DI in addresses which are designated by a writing address port W-AD, i.e., the input data are stored in the respective time slots. At the time of data reading from the data memory 1, the data stored in the addresses which are designated by a reading address port R-AD are output from a data output port DO.

Reference numeral 2 denotes an address counter, in which a clock signal is counted cyclically and the counted value is output from the address port AD, thereby designating a writing address and reading address to the data memory 1. For example, in case of data having 3 time slots, the address counter 2 divides the clock signal into 3 out of one period. For example, when each data that is written to the data memory 1 has 3 time slots, the address counter 2 divides the clock signal into 3 out of one period and counts the time slots, thereby giving an address signal to the data memory 1 in accordance with the counted value.

Reference numeral 3 denotes an address control memory, in which the reading address designated by the address counter 2 is changed to a different address in accordance with the stored data. The address control memory 3 is provided for changing time slot data, and previously memorizes where to change the position of data in time slots for each position of input data.

Thus, the address control memory 3 provides a reading memory 5 for storing data to an address which is a position of the time-division multiplexed data in time slots which address is given when the time-division multiplexed data is read from the data memory 1 as output data and the data is a position of the multiplexed data in time slots, given when the time-division multiplexed data is written to the data memory 1 as input data. A writing memory 7 stores data to an address which is a position of the time-division multiplexed data in time slots, given when the time-division multiplexed data is written to the data memory 1 in which the data is a respective position of the multiplexed data in time slots, given when the time-division multiplexed data is read from the data memory 1.

The reading memory 5 changes the address which was entered from the reading address port R-AD in accordance with the content memorized therein. In the example shown in FIG. 1, the addresses 1, 2 and 3 are changed to the addresses 3, 1 and 2, respectively. Then, the changed address is output from the address port AD and transmitted to the reading address port R-AD in the data memory 1.

According to the structure of this time switch, data is written to the data memory 1 sequentially in accordance with the counted value which is counted by the address counter 2, while data is read from the data memory 1 at random by changing the counted value which is counted by the address counter 2 in accordance with the reading memory 5 of the address control memory 3.

In concrete, when data is received which have one-cycle time slot positions arranged in the order of A, B and C, the data A, B and C are written in that order into the data memory 1 in accordance with the address values counted by the address counter 2.

When data is read, the address values counted by the address counter 2 are changed in accordance with the reading memory 5. This changes the time slot position so that the data written in the order of A, B and C are read in the order of C, A and B, in other words, thereby changing the order of the data.

The writing memory 7 provided in the address control memory 3 has a capacity equals to the reading memory 5, and each of the address and data in the reading memory 5 are alternated so as to correspond to each of the data and address in the writing memory 7.

The relationship between the address and data in the reading memory 5 is as follows:

Address: a position of output data in a time slot, and
Data: a position of input data in a time slot.

While, the relationship between the address and data in the writing memory 7 is as follows:

Address: the position of input data in a time slot, and
Data: the position of output data in a time slot.

Figure 2:
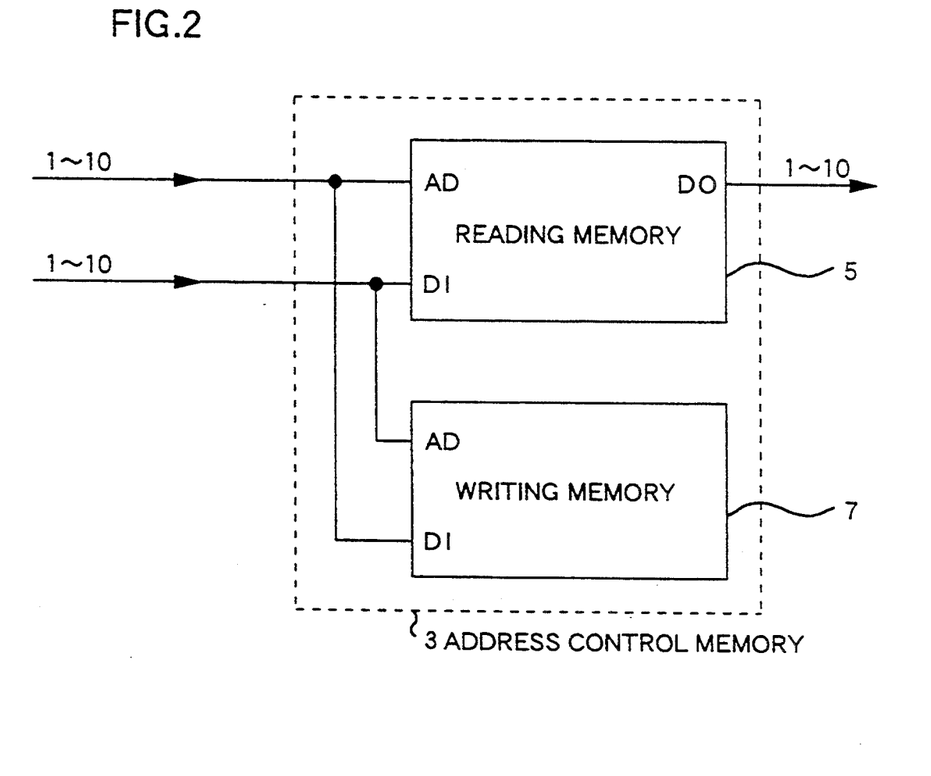
FIG. 2 is an explanation view showing a manner for writing data to the address control memory.

FIG. 2 shows a manner that data are written to the address control memory 3 described above. As shown in this figure, in case of writing data to the address control memory 3, an address entered in the address port (AD) in the reading memory 5 and the address is also entered in the data input port (DI) in the writing memory 7. In addition, data is entered in the data input port (DI) in the reading memory 5 and the data is also entered in the address input port (AD) in the writing memory 7. In this way, addresses and data entered in the reading memory 5 are replaced to the data and addresses and entered in the writing memory 7.

FIG. 2 shows the case of having 10 time slots, in which the addresses and data respectively have 10 types from 1 to 10. Since the reading memory 5 is used for changing the address, data reading is performed only from the data output port (DO) in the reading memory 5.

Figure 3A:
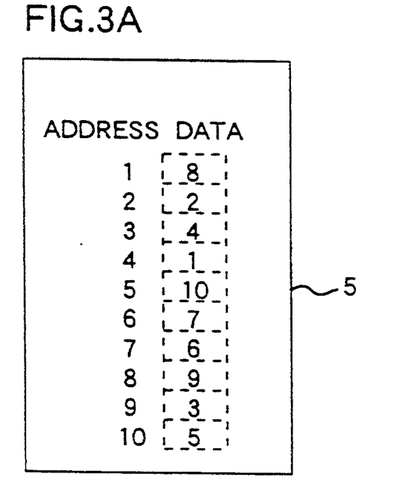
FIGS. 3A and 3B are explanation views showing each example of writing data to the reading memory and the writing memory.
Figure 3B:
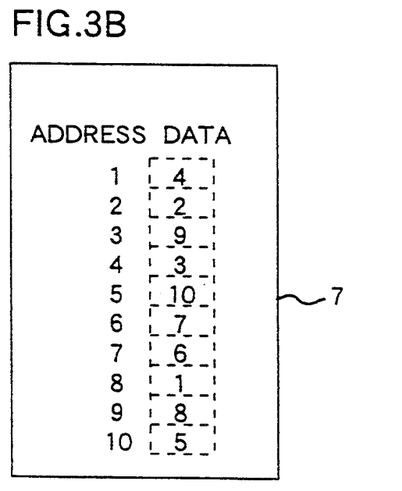

FIGS. 3 (a) and 3 (b) show an example of data writing in the reading memory 5 and the writing memory 7. As seen from this figure, in case of having 10 time slots, addresses and data from 1 to 10 that are entered in the reading memory 5 are respectively replaced to data and addresses and entered in the writing memory 7.

In concrete, when the addresses and data are entered in the reading memory 5 as shown in FIG. 3 (a), the addresses and data are entered in the writing memory 7 as shown in FIG. 3 (b).

Accordingly, in order to confirm the position of the input data in the time slot corresponding to the position of the output data in the third time slot, the address 3 in the reading memory 5 is called, thereby confirming that it is the data in the input data in the fourth time slot.

Also, in order to confirm the position of the output data in the time slot corresponding to the position of the output data in the fifth time slot, the address 5 in the writing memory 7 is called, thereby confirming that it is the data in the output data in the tenth time slot.

As described above, the positions of data input and output in time slots can be instantly specified by confirming the time slot position at the time of data input corresponding to the time slot position at the time of data output and the positions of data in time slots at the time of data output corresponding to the time slot position at the time of data input, which is achieved simply by calling one address.

Figure 4:
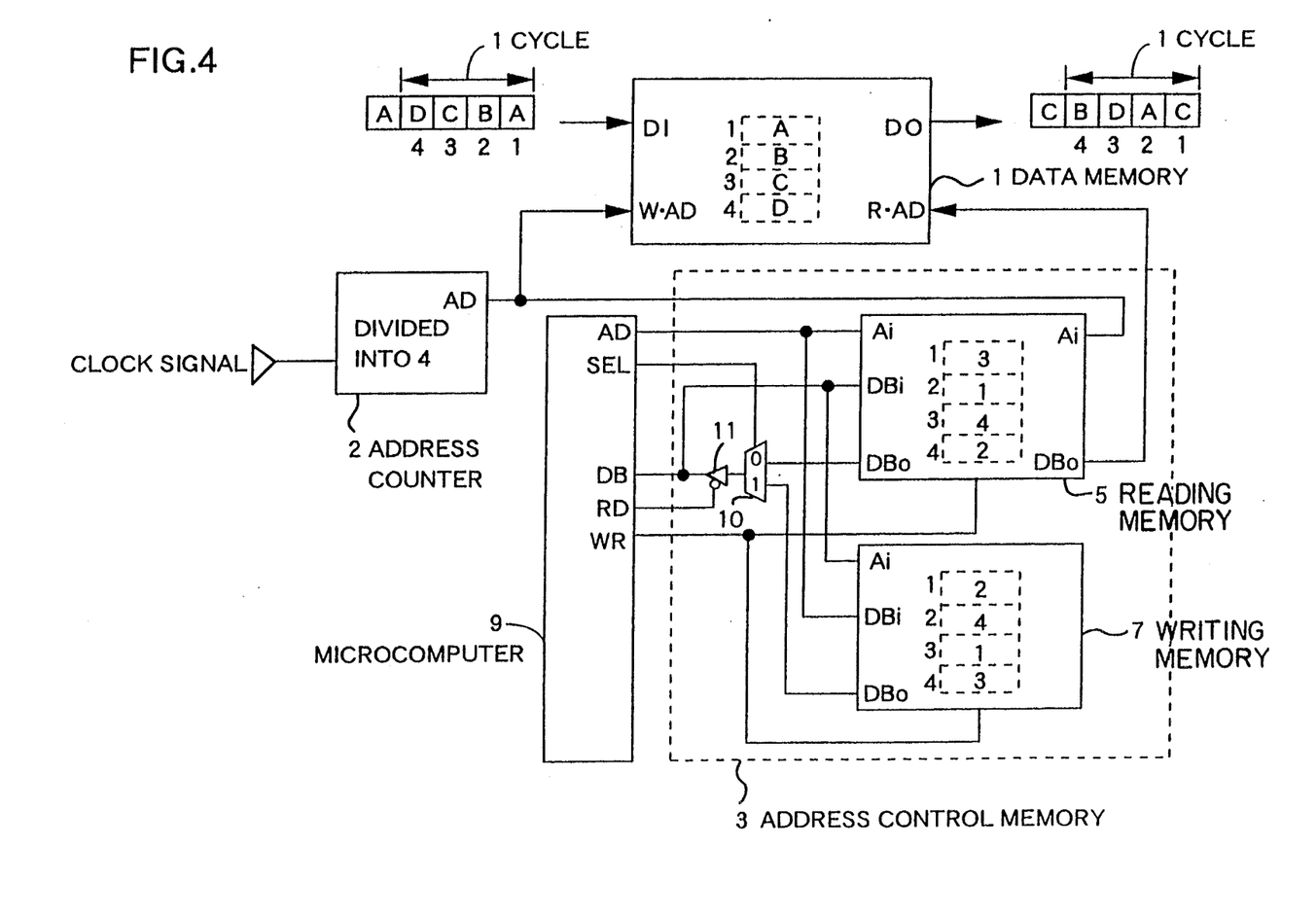
FIG. 4 is a block diagram showing a detailed circuit structure of the present invention.

FIG. 4 shows a block diagram illustrating a detailed circuit structure of the present invention. In this figure, the structural constituents have the same reference numbers used in FIG. 1, so that the description for the reference numerals is omitted.

This circuit is provided with a microcomputer 9, by which data can be written to the reading memory 5 and the writing memory 7 in the address control memory 3.

The microcomputer 9 includes the address port AD for outputting address, a select port SEL for selecting either one of the reading memory 5 and the writing memory 7 when reading data, a data bus port DB for giving or receiving data, a read port RD for designating data reading from the reading memory 5 and the writing memory 7, and a write port WR for designating data writing to the reading memory 5 and the writing memory 7.

The reading memory 5 and the writing memory 7 respectively have two address input ports Ai of the same function for receiving the designation of address, a data bus input port DBi for receiving data, and two data bus output ports DBo of the same function for outputting data.

The reference numeral 10 denotes a selector which works for switching the data of the reading memory 5 and the writing memory 7 in accordance with a select signal from the select port SEL in the microcomputer 9. The reference numeral 11 denotes a gate for controlling a direction of data by receiving a signal from a read port RD.

According to the microcomputer 9, when data are written to the reading memory 5 and the writing memory 7, an address is transmitted to each address port Ai of the reading memory 5 and the writing memory 7, and data is transmitted to each data bus input port DBi.

In this case, the address port Ai of the reading memory 5 is connected to the data bus input port DBi of the writing memory 7, and the data bus input port DBi of the reading memory 5 is connected to the address port Ai of the writing memory 7.

Accordingly, each of the address and data in the reading memory 5 and the writing memory 7 are replaced with each other and written as the counter memory at the same time.

In case of using the microcomputer 9 for reading data from the reading memory 5 or the writing memory 7, either of the reading memory 5 and the writing memory 7 is selected by transmitting a select signal to a selector 10 from a select port SEL and transmitting the address to the address port Ai, thereby reading data from the data bus output port DBo of the reading memory 5 or the writing memory 7.

The function of this circuit is described with respect to the case having 4 time slots as follows.

In the data memory 1, for example, 4 bits data consisting of A, B, C and D for one frame are entered. The address counter 2 divides one period into four and counts as 1, 2, 3, 4, 1, 2, 3, 4 . . . , repeatedly from the top of the data frame.

As the addresses are entered from the address counter 2, the data A, B, C and D are entered so that the address 1-data A, address 2-data B, address 3-data C, and address 4-data D are written to the data memory 1 in this order.

When reading data, the address of the address counter 2 is changed by the reading memory 5 in the address control memory 3. Therefore, the data having 4 bits are read in the order of data C, data A, data D and data B.

For example, when data shown in FIG. 4 are written to the reading memory 5 and the writing memory 7 in the address control memory 3, the microcomputer 9 selects the reading memory 5 and read the data 1 in the address 2 in order to confirm where the data in the second time slot position at the time of output is positioned at the time of input. In this way, the microcomputer 9 can confirm that the data in the second time slot at the time of output is in the first time slot position at the time of input.

To the contrary, in order to confirm where the data in the second time slot position at the time of input is positioned at the time of output, the microcomputer 9 selects the writing memory 7 and read the data 4 in the address 2. In this way, the microcomputer 9 can confirm that the data in the second time slot at the time of input is in the fourth time slot position at the time of output.

Figure 5:
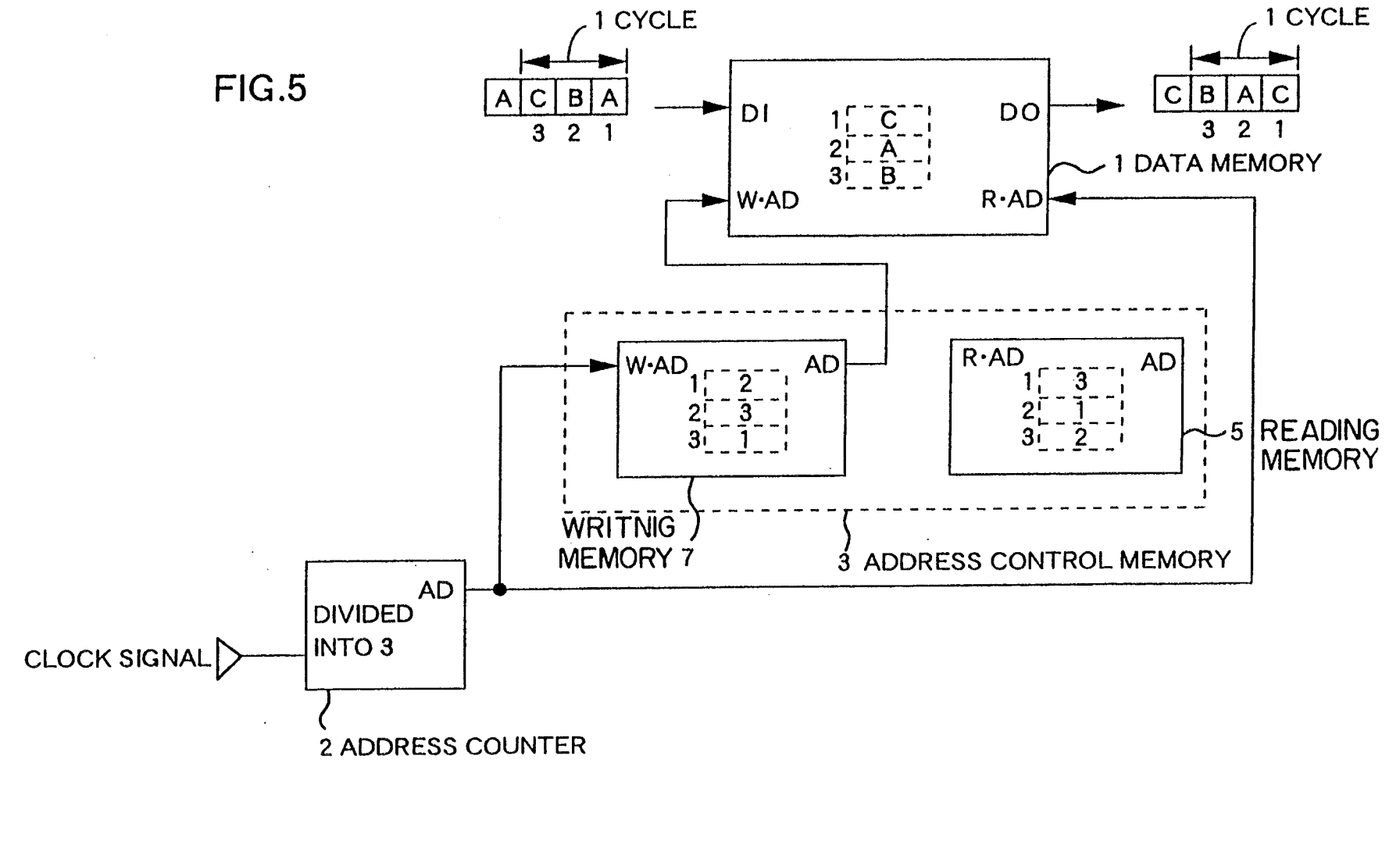
FIG. 5 is a block diagram view showing another example of the present invention.

FIG. 5 shows a block diagram illustrating another example of the present invention. In this figure, the structural constituents have the same reference number used in FIG. 1, so that the description for the reference numeral is omitted.

This example is different from the above example of the present invention in that the address to the data memory 1 is changed by the writing memory 7 of the address control memory 3.

In particular, the writing memory 7 changes the address that is entered from the address port W-AD in accordance with the memorized data therein. For example, in FIG. 5, the addresses 1, 2 and 3 are changed to the addresses 2, 3 and 1, respectively. The changed addresses are output from the address port AD and transmitted to the writing address port W-AD of the data memory 1.

According to the structure of this time switch of the present example, data writing to the data memory 1 is conducted at random by changing the counted values which are counted by the address counter 2 in accordance with the writing memory 7 of the address control memory 3, while data reading from the data memory 1 is conducted sequentially in accordance with the counted values which are counted by the address counter 2.

In concrete, upon receiving data of which the time slot in one period are arranged to be A, B and C in this order, the data are written in the order of C, A and B to the data memory 1 by changing the address values counted by the address counter 2 in accordance with the writing memory 7.

When reading the data, the time slot position is transformed by reading the data in the order of C, A and B in accordance with the address values counted by the address counter 2.

The other structure of this example is the same as the previous example. Namely, similar to the previous example, the time slot position of data at the time of writing can be confirmed from the time slot position of data at the time of reading, and the time slot position of data at the time of reading can be confirmed from the time slot position of data at the time of writing, thereby instantly specifying the changed time slot position simply by calling one address.

Thus, according to the structure of this example, when data arrangement position on the input or output side have to be specified from the output or input side in case of circuit damage or the like, the data arrangement position can be also confirmed immediately.

Since the device of the present invention is provided with two memories, i.e., the reading memory and the writing memory, as the address control memory, the changed time slot position of the input or output data in the data memory can be instantly confirmed simply by calling one address. Therefore, the present invention would greatly contribute to improve the processing speed for confirming the replaced data position.

I claim:

1. A circuit for confirming a connection route of AN address control memory comprising:
   a data memory for storing time-division multiplexed data applied to a plurality of time slots for each of the time slots;
   address designating means for designating a writing address and a reading address to the data memory; and
   address changing means for changing either of the writing address or the reading address designated by the address designating means to a different address, wherein the address changing means is incorporated in the address control memory and comprises:
   a reading memory for storing data to addresses which are positions of the time-division multiplexed data in time slots given when the time-division multiplexed data are read from the data memory as output data, the data being positions of the time-division multiplexed data in time slots given when the time-division multiplexed data are written to the data memory as input data; and
   a writing memory for storing data to addresses which are positions of the time-division multiplexed data in time slots given when the time-division multiplexed data are written to the data memory as input data, the data being positions of the time-division multiplexed data in time slots given when the time-division multiplexed data are read from the data memory as output data,
   so as to specify from the positions of the time-division multiplexed data in the time slots given when the data are read from the data memory, the positions of the time-division multiplexed data in the time slots given when the data are written to the data memory, and specify from the positions of the time-division multiplexed data in the time slots given when the data are written to the data memory, the positions of the time-division multiplexed data in the time slots given when the data are read from the data memory.

2. A circuit according to claim 1, wherein the address designating means comprises an address counter, the address control memory changing reading addresses designated by the address counter to different addresses, and the data memory receiving the writing addresses from the address counter and the changed reading addresses from the reading memory so that the time-division multiplexed data are sequentially written to the data memory with the writing addresses from the address counter and read at random from the data memory with the changed reading addresses from the reading memory.

3. A circuit according to claim 1, wherein the address designating means comprises an address counter, the address control memory changing writing addresses designated by the address counter to different addresses, and the data memory receiving the changed writing addresses from the writing memory and the reading addresses from the address counter so that the time-division multiplexed data are written at random to the data memory with the changed writing addresses from the writing memory and sequentially read from the data memory with the reading addresses from the address counter.

4. A circuit according to claim 1, wherein the reading memory and the writing memory store and output data to and from an address with instruction of the address and the data through a microcomputer.

5. A circuit according to claim 2, wherein the address counter divides a clock signal used for writing data to and reading data from the data memory in accordance with the number of the time slots for the time-division multiplexed data to be written to the data memory for counting the time slots followed by designating an address to the data memory in accordance with the counted value of the time slots.

6. A circuit according to claim 3, wherein the address counter divides a clock signal used for writing data to and reading data from the data memory in accordance with the number of the time slots for the time-division multiplexed data to be written to the data memory for counting the time slots followed by designating an address to the data memory in accordance with the counted value of the time slots.

* * * * *